United States Patent [19]

Rettig

[11] 3,829,754

[45] Aug. 13, 1974

[54] COMPENSATED ADJUSTABLE FREQUENCY POWER SUPPLY OF THE INVERTER TYPE

[75] Inventor: Charles E. Rettig, Brookfield, Wis.

[73] Assignee: The Louis Allis Company, Milwaukee, Wis.

[22] Filed: Jan. 8, 1973

[21] Appl. No.: 321,926

Related U.S. Application Data

[62] Division of Ser. No. 83,922, Oct. 26, 1970.

[52] U.S. Cl. .................................. 321/2, 318/227
[51] Int. Cl. .......................................... H02m 5/44
[58] Field of Search ........... 321/2, 4, 45 C; 318/227

[56] References Cited
UNITED STATES PATENTS 3,403,318  9/1968  Krauthamer et al. ............. 321/21 X
3,612,971  10/1971  Blaschke et al. .................... 318/227

Primary Examiner—William M. Shoop, Jr.

[57] ABSTRACT

A power supply of the inverter type for controlling the operative condition of an alternating current load includes a power source providing an output having a predetermined ripple component. An inverter is connected in series with the power source for providing variable frequency energization to the load. This variable frequency energization generates a variable frequency ripple component, the effects of which on the power source are minimized by a sensing means which accentuates the power source's own ripple. A rate transformer may be used for this purpose.

13 Claims, 8 Drawing Figures

COMPENSATED ADJUSTABLE FREQUENCY POWER SUPPLY OF THE INVERTER TYPE

CROSS REFERENCE TO RELATED APPLICATION

This application is a divisional application of Ser. No. 83,922 filed Oct. 26, 1970.

BACKGROUND OF THE INVENTION
1. Field of the Invention

The present invention relates to adjustable frequency power supplies for alternating current loads, and more particularly to an inverter power supply having ripple compensation.

2. Description of the Prior Art

With the advent of reliable, high power rating, low cost semiconductor components, such as silicon controlled rectifiers, commonly, and herein, termed thyristors, adjustable frequency control equipment has become more practical from a technical and economic standpoint. A highly useful, but by no means exclusive, application of such adjustable frequency equipment is in the control of alternating current motors. Other applications may typically include power supplies for lighting and induction heating apparatus.

In the case of alternating current motors, the speed of the motor depends on the frequency of the alternating current applied to the motor, and in the usual case, the most readily available power source is of constant frequency, for example, 60 cycles per second, or Hertz, power mains. Operation of alternating current motors from such power supplies, severely limits their application since the output characteristic exhibited is that of constant speed operation. Thus, to provide variable speed operation to an alternating current motor, it is necessary to energize the motor from a variable frequency power supply. A variable frequency power supply of the inverter type includes a direct current link by which the constant frequency of the power mains is converted into direct current and the direct current subsequently changed back into alternating current of the desired variable frequency.

In addition to being of constant frequency, industrial power mains are usually of a constant voltage, for example, 240 volts. Thus, most of the adjustable frequency inverter power supplies heretofore developed have been voltage operated and controlled devices. Such power supplies may be characterized as "voltage source inverters." While the use of such voltage source inverters permits operation of alternating current loads, such as induction or synchronous reluctance motors, several serious problems have been encountered in their use.

Numerous operating phenomena, both steady state and transient, affect the operation of voltage source inverter. These phenomena include start up conditions, low frequency operation, variation in electrical characteristics of the alternating current load, low voltage operation, commutation faults in the inverter, etc. This sensitivity of voltage source inverters to operating conditions is particularly troublesome because the effect on inverter operation is usually catastrophic. The result is at a minimum, the blowing of high speed, current limiting fuses and shut down of the power supply and, at a maximum, damage to components of the power supply and/or the alternating current load due to high circulating currents. For example, in the case of a voltage source inverter motor drive, a peak current flow of almost twice peak locked rotor current or 1,000 to 3,000 percent of rated current may appear in the motor as a result of inverter malfunction. From the mechanical standpoint, a peak torque of perhaps 2,000 percent of rated torque may appear.

To improve the operation of variable frequency inverter power supplies, it has been suggested that a current source be incorporated in the power supply instead of a voltage source. See the article entitled "Regulation of a Device for Feeding Asynchronous Motor with Imprinted Stator Current" published by F. Blashke et al. in Seimens Zeitschrift, Volume 42, No. 9, pages 773-777 (Sept. 1968). By the term current source is meant a power source which provides a current of the desired magnitude at its output terminals irrespective of the voltage impressed on those output terminals.

The use of a current source power supply lends many operative advantages. In the example mentioned above, in the event of an inverter malfunction, when a current source, rather than a voltage source, is used, the current remains at the desired level and peak motor torque does not exceed 120 to 140 percent of steady state torque. Thus, the power supply is inherently current limiting and is self protecting against overloads and short circuits, as well as having additional operating stability.

In spite of such advantages, current source power supplies are not commonly known or used at present. This is due to the use of power supply and inverter circuitry which is defective in numerous structural and operative aspects, including complicated commutation sequences to effect the generation of alternating current, complicated starting sequences, limitation to full wave operation, and poor current regulation.

As hereinafter described in greater detail, one of the problems affecting such power supplies is the appearance of undesirable beat frequency ripple components in the current of the power supply.

SUMMARY OF THE PRESENT INVENTION

It is, therefore, the object of the present invention to provide an improved adjustable frequency current source power supply of the inverter type which enhances the heretofore known advantages of such current source controls.

It is a further object of the present invention to provide an improved adjustable frequency current source power supply including means for reducing the effects of beat frequency ripple components on the operation of the power supply.

Yet another object of the present invention is to provide an improved adjustable frequency current source power supply further including means for reducing the effects of the voltage generated by the inverter on the provision of the current.

An additional object of the present invention is to provide an adjustable frequency current source power supply having high electrical efficiency, low accoustical noise and which is suitable for use with high frequency alternating current loads.

A still further object of the present invention is to provide an adjustable frequency current source power supply having improved regulation of operative conditions occurring in the power supply, thereby to enhance its operation.

Another object of the present invention is to provide an adjustable frequency current source power supply which provides for the regeneration of electrical power from the motor to electric power mains of either the direct current or alternating current type.

Briefly, the present invention provides a power supply interposible between an electrical energy source, and an alternating current load, such as a motor, for controlling the operative condition of the latter. The power supply includes a power source connectable to the electrical energy source for providing a unipolarity voltage having a predetermined ripple component and an output current of a desired magnitude at the output terminals thereof. An inductor is connected to the output of the power source to assist current regulating circuitry in maintaining the output current at the desired magnitude.

An inverter is connected in series with the power source and inductor and has its output termianls coupled to the load. The inverter provides variable frequency energization to the load.

A sensing means is coupled to the output of the power source for sensing the ripple component of the output and for accentuating same in the current regulation of the power source, thereby to minimize the effects of the inverter variable frequency ripple. The sensing means may comprise a rate transformer. The power supply may include means, such as an additional winding in the transformer, for compensating for the effects of the voltage generated by inverter operation.

DESCRIPTION OF THE PREFERRED EMBODIMENT

Figure 1:
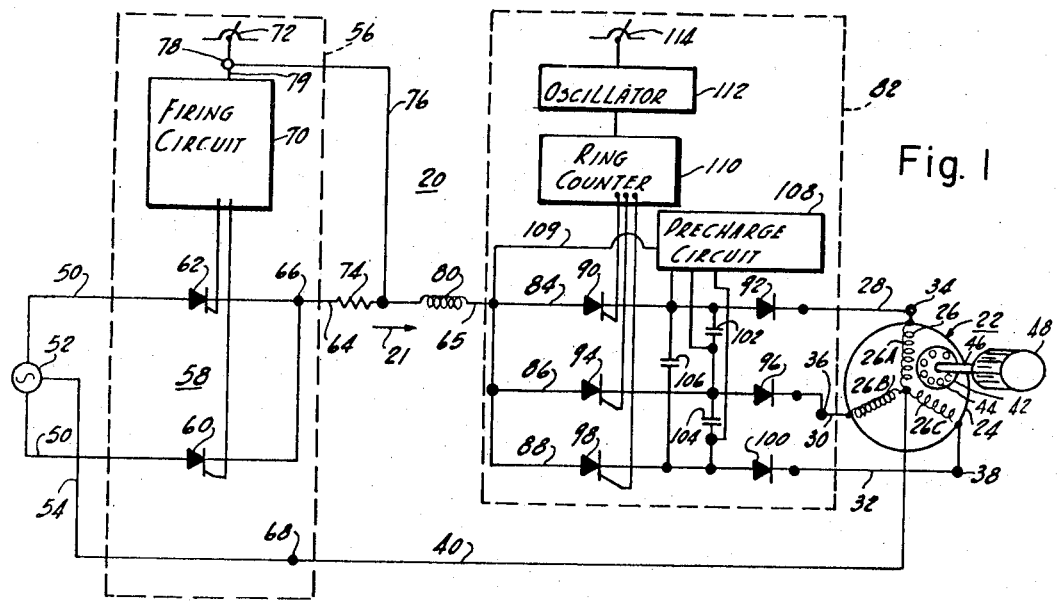
FIG. 1 is a schematic diagram of an adjustable frequency current source power supply.

In FIG. 1, there is shown an adjustable frequency current source power supply 20 for controlling the operative condition of an alternating current device, shown for illustrative purposes as induction motor 22. Alternating current induction motor 22 includes a stator 24 of conventional laminated iron core construction having polyphase stator winding 26 disposed therein for generating a revolving magnetic field when energized. Stator winding 26 includes stator coils 26A, 26B and 26C connected to form a conventional star connected stator winding. Stator coils 26A, 26B and 26C are energized by supply lines 28, 30 and 32, respectively, connected to the corresponding motor input terminals 34, 36 and 38. A neutral conductor 40 is connected to the center tap of star connected stator winding 26.

Stator 24 surrounds rotor 42 having rotor conductors 44 circumferentially spaced in a laminated iron core. The rotor output shaft 46 is connected to the load 48 of motor 22.

When energized, motor 22 exhibits a small amount of impedance in series with each of the input terminals 34, 36 and 38. This impedance comprises, in the main, the leakage reactance of the motor and is small when compared to the rated impedance of the motor.

Current source power supply 20 is shown in simplified form in FIG. 1 to facilitate an understanding thereof. The supply is shown as energized by alternating current, typically, power mains 50 connected to alternating current source 52. The alternating current source includes center tap conductor 54. Power mains 50 are connected to power source 56 of power supply 20. Power source 56 may include a full wave rectifier 58 having the anodes of thyristors 60 and 62 connected to power mains 50. The cathodes of the controlled rectifiers are connected to output terminal 66 and conductor 64. The direct current output of source 56 appears at output terminal 66 and at output terminal 68 located between conductor 54 and conductor 40. The arrow identified by the number 21 in FIG. 1 indicates the output current of power source 56 and its direction of flow out of output terminal 66 and into output terminal 68.

The magnitude of direct current 21 provided by power source 56 is controlled by firing circuit 70 which supplies signals to the gate terminals of the thyristors. Firing circuit 70 may be any firing circuit suitable for providing firing signals to the thyristors at desired firing angles, responsive to a signal from a control device, such as potentiometer 72, and to the various feedback signals applied to the firing circuit, as hereinafter described. For example, firing circuit 70 may be a biased sine wave, phase shift firing circuit such as is shown on page 434 of J. Millman and S. Seely, Electronics, (1941).

The power source 56 must function as a current source, that is, a source, the output current of which does not vary with the output voltage. To accomplish this, it is necessary to provide current regulation to the source and to insert an inductor in the output thereof to assist in maintaining current 21 at the desired level.

A simplified current regulation circuit is exemplarily shown in connection with source 56 in FIG. 1 including an output current sensing means, such as resistor 74 in conductor 64, which provides a feedback signal corresponding to the actual output current 21 of source 56 in conductor 76. The signal in conductor 76 is compared with the signal corresponding to desired current from potentiometer 72 at summing junction 78 and a current error signal provided in conductor 79 to firing circuit 70. The regulation provided by the aforementioned feedback signal and circuitry causes the actual output current of source 56 to approach the desired current, as selected by potentiometer 72.

An inductor or choke 80 is interposed in conductor 64 to prevent any rapid changes in the magnitude of direct current 21 supplied by power source 56. Inductor 80 serves to absorb short duration voltage transients and smooth out the ripple current produced in the power supply and further, provides the necessary integration function essential to the stability of the current regulator. The size of inductor 80 may be commensurate with the speed of regulating action of the current regulator.

Current regulated power source 56 and inductor 80 form a current source which provides current 21 of a desired magnitude to the remaining portion of the power supply. In order to maintain a current source characteristic of power supply 20, it is essential that no substantial energy storage means of the constant voltage type, for example, capacitors, be placed across conductors 64 and 40, either in the inverter portions of the power supply or elsewhere, as such elements would compromise the current nature of the power supply.

Inverter 82 is connected to conductor 65 in series with inductor 80 and the terminals 34, 36, and 38 of motor 22 to cyclically direct current 21 into stator coils 26A, 26B and 26C so as to provide the rotating magnetic field in motor 22 necessary to revolve motor output shaft 44. In the simplified motor control 20 shown in FIG. 1, the current 21 flows into each stator coils 26A, 26B and 26C from the respective input terminas 34, 36, and 38 and flows out of the winding into conductor 40 for return to terminal 68 of power source 56.

Inverter 82 comprises three parallel current paths 84, 86 and 88 extending between conductor 64 and output conductors 28, 30 and 32. Thyristor 90 and diode 92 are connected in series in current path 84. Thyristor 94 and diode 96 are connected in series in current path 86 and thyristor 98 and diode 100 are connected in series in current path 88.

A commutating capacitor is connected across each pair of current paths to effect turn off of the thyristors 90, 94 and 98. Capacitor 102 is connected across current paths 84 and 86, capacitor 104 is connected across current paths 86 and 88, and capacitor 106 is connected across current paths 84 and 88. To assist in the start up of inverter 82, a precharge circuit 108 is connected to the capacitors and by conductor 109 to conductor 65.

Thyristors 90, 94 and 98 are fired, or rendered conductive, by a firing means which may typically consist of ring counter 110 and oscillator 112. Oscillator 112, which may be of the relaxation type, generates a series of firing pulses to ring counter 110. The frequency of generation of these pulses is determined by a control, shown diagrammatically as potentiometer 114. Ring counter 110 distributes these firing pulses to thyristors 90, 94 and 98 in the desired sequence. The desired sequence may be as above, or it may be the reverse, i.e., thyristors 98, 94, and 90. The sequence in which the thyristors are fired determines the sequence energization of the stator coils of motor 22 and the direction of rotation of the rotating magnetic field of stator winding 26 of motor 22. The rate at which firing pulses are generated by oscillator 112 determines the speed of rotation of the stator magnetic field. Ring counter 110 may be of the type shown on page 4—4 of Application Memos, published by the Signetics Corp., Sunnyvale, Cal., (1968).

Inverter 82, which may be described as a diode isolated capacitor commutated inverter, effects commutation by current transfer, that is, by transferring current out of one of the parallel current paths into another current path.

In operation, potentiometer 72 is adjustable to provide current 21 of a desired magnitude at output terminals 66 and 68 of power source 56. Inverter 82 causes a periodic and sequential application of this current to stator coils 26A, 26B and 26C in the form of square wave current pulses. The current pulses generate a rotating stator magnetic field in motor 22. The interaction of the stator field with rotor conductors 44 causes rotor 42 to rotate in accordance with the rotation of the stator magnetic field and at a speed proportional to the frequency of application of the stator current pulses, as selected by manipulation of potentiometer 114.

The manner in which inverter 82 causes the periodic and sequential application of current 21 to the coils of stator winding 26 is as follows. It may be assumed that thyristor 90 is in the conductive state and is supplying current 21 from output terminal 66 of power source 56 through diode 92 to conductor 28 and stator coil 26A. It may also be assumed that capacitor 106 and capacitor 102 have been charged such that a positive potential exists on the common connection of the cathode of thyristor 90, the upper plates of capacitors 106 and 102 and the anode of diode 92.

When current 21 has flowed through stator coils 26A for a time period commensurate with the frequency of energization of stator winding 26, thyristor 94 is gated. When thyristor 94 is gated, the current in thyristor 90 is extenquished by the voltage on capacitors 106 and 102. Thyristor 90 is thus commutated off by capacitors 106 and 102. The current 21 from power source 56 then flows through thyristor 94 but remains momentarily unchanged through diode 92, capacitors 102, 104 and 106 and stator coil 26A. Current flow through capacitor 102 from thyristor 94 to diode 92, discharges capacitor 102, causing its voltage to go through zero and to build up in the opposite polarity. As the voltage on capacitor 102 becomes equal to the voltage between conductors 28 and 30, diode 96 becomes unblocked and the voltage on capacitor 102 is applied to stator coils 26A and 26B. This initiates current flow in conductor 30 and stator coil 26B and commences the transfer of current from stator coil 26A to 26B. The transfer of current from stator coil 26A to 26B of motor 22 proceeds at an increasing rate as the voltage on capacitor 102 continues to build up due to the stator coil 26A current still flowing through it. Finally, the complete current 21 from power source 56 is transferred or commutated into stator coil 26B, leaving capacitor 102 charged with a very substantial negative potential at the upper plate and a corresponding positive potential at the lower plate, due to the leakage reactance of the motor 22.

During the above described commutation, at the same time current is flowing through capacitor 102, current is also flowing serially through capacitor 104 and capacitor 106 so that at the completion of the commutation, capacitor 104 has been charged with its upper plate positive and its lower plate negative. This charge and the charges on capacitors 102 and 106 are retained on the capacitors by the blocking, or isolating, action of the associated diodes.

When thyristor 98 is fired to continue the cyclical application of current 21 to stator winding 26, capacitors 102 and 104 effect the turn off of thyristor 94 and the commutation of current from stator coil 26B to 26C in a manner similar to that described above. When thyristor 90 is fired capacitors 104 and 106 effect the turn off of thyristor 98 and the commutation of current 21 from stator coil 26C to 26A.

While the thyristors in power supply 20 have been shown as silicon controlled rectifiers in FIG. 1, it will be appreciated that other devices such as gas filled tubes may be used.

The repetitive and sequential application of current 21 to the coils of stator winding 26 by inverter 82 is continued during the motoring operation of motor 22 to drive load 48. The speed of motor 22 and load 48 may be altered by altering the frequency of application of the current pulses, as by manipulation of potentiometer 114.

The magnitude of the output current 21 of power source 56 is maintained at the desired level regardless of load and speed changes in motor 22, and the resulting voltage changes in power supply 20, by the action of the current regulating circuitry of power source 56. This circuitry advances or retards the firing angles of the thyristors in rectifier 58 so as to provide the output voltage from power source 56 necessary to maintain current 21 at the desired level. The magnitude of current 21 may be altered by manipulation of potentiometer 72.

Power supply 20 is inherently capable of regenerative operation. Regenerative operation facilitates maintaining control over the speed of motor 22 under conditions in which load 48 is driving motor 22 faster than inverter 82. Such a condition is commonly called operation with an overhauling load and results in a reversal of the voltage between conductors 65 and 40 so that the motor becomes a source of electrical power, rather than a load. The direction of current flow through power supply 20 remains the same.

As in motoring operation, the current regulating circuitry of power source 56 operates to automatically maintain current 21 of power supply 20 at the desired level, regardless of the terminal voltage inverter 82 and will provide, from power source 56, a voltage of the magnitude and polarity necessary to so maintain the current. Under conditions in which the voltage at the terminals of motor 22 has reversed, the current regulating circuitry of power source 56 will cause the voltage of the power source to reverse so that the power source becomes an electrical load for motor 22 as a source. This effects regenerative operation.

Figure 2:
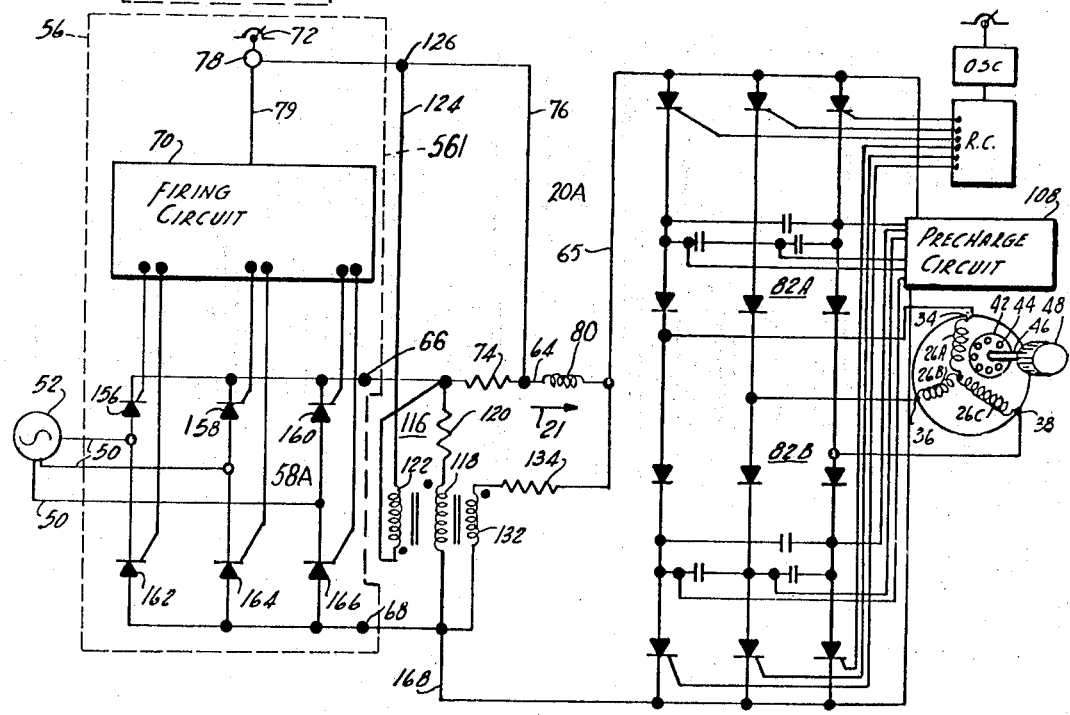
FIG. 2 is a schematic diagram of the embodiment of the adjustable frequency current source power supply of the present invention.
Figure 5:
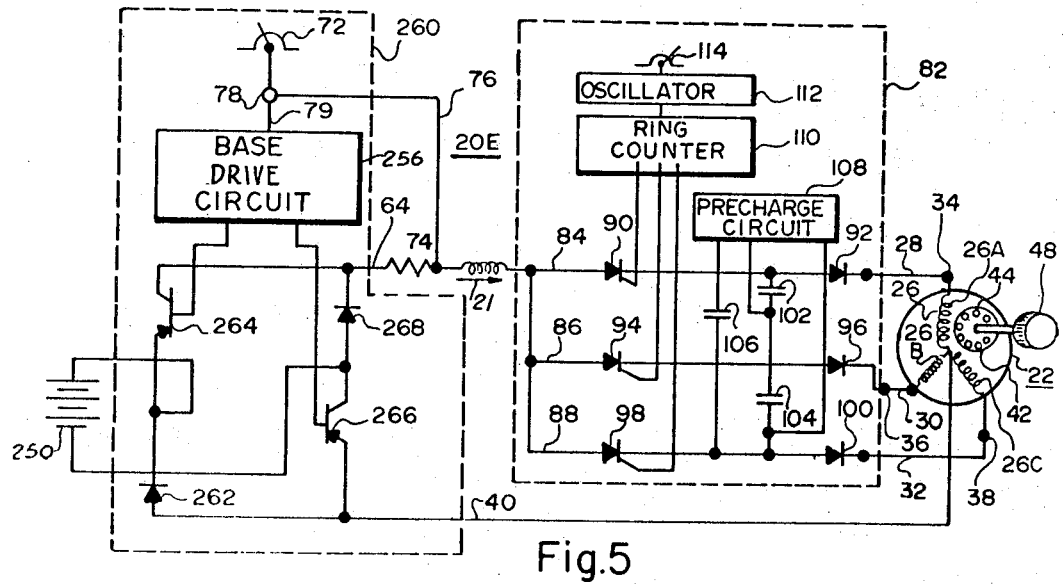
FIG. 5 is a schematic diagram of an adjustable frequency current source power supply suitable for use with a direct current voltage source and capable of regenerative operation.

FIG. 2 shows, in schematic form, a more elaborate embodiment of adjustable frequency current source power supply 20. The power supply, 20A, is shown as energized by three phase power mains 50. Further, power supply 20A is shown as including a pair of series connected inverters 82A and 82B. Supply lines 28, 30 and 32 are connected between inverters 82A and 82B so that by the coordinated operation of inverter 82A and inverter 82B, current 21 may be made to flow both into and out of each of stator coils 26A, 26B and 26C. In this respect, the operation of power supply 20A of FIG. 2 differs from the operation of power supply 20 shown in FIG. 1. Power supply 20A permits operation of motor 22 in a manner analogous to direct connection of the motor to a polyphase alternating current power outlet. Neutral conductor 40 is eliminated.

Power mains 50 are connected to the anodes of thyristors 156, 158 and 160 and to the cathodes of thyristors 162, 164 and 166 of power source 56. The cathodes of thyristors 156, 158 and 160 are connected to conductor 168. The anodes of thyristors 162, 164 and 166 are connected to conductor 64. It will be recognized that thyristors 156 through 166 form a full wave rectifier bridge 58A.

FIG. 2 also shows additional regulation of the output of power source 56 in the form of a voltage rate feedback circuit. In order to maintain the desired magnitude of output current 21 at output terminals 66 and 68, it is necessary to optimize the operation of power source 56 to provide both the fast response characteristics and stability necessary to provide satisfactory operation to the source. This makes the use of the voltage rate feedback circuit desirable.

As noted above, thyristors 156 through 166 of rectifier bridge 58A generate an output voltage at terminals 66 and 68 which provides current 21 of the desired magnitude when applied to inductor 80. The operation of the thyristors is regulated, preferably in a highly responsive manner, by firing circuit 70 responsive to the current feedback signal in conductor 76. The operation of inverter 82 also generates a voltage which is applied to inductor 80 and which attempts to alter the magnitude of current 21 flowing in power supply in an unpredictable manner with respect to the current regulating action of the inductor and feedback signal.

When the voltage generated by the operation of inverter 82 is changing slowly, the response and stability characteristics of the power source 56 and firing circuit 70 are sufficient to maintain regulation of the current magnitude. It is when the voltage generated by inverter operation changes rapidly and by large amounts in a cyclical, non synchronous manner that control over the magnitude of current 21 by the current regulator may be impaired. The aforesaid abrupt, large magnitude voltage changes may appear as ripple voltage produced by inverter operation including commutation voltage peaks.

It must be noted that because power source 56 is of the rectifier type, the output voltage, and hence output current, of the power source includes substantial ripple components separate and apart from inverter voltage ripple. The power source ripple components are particularly pronounced when the thyristors 156 through 166 are fired at retarded firing angles. The power source ripple appears in the current feedback signal in conductor 76 and is applied to firing circuit 70. However, since the ripple in the feedback signal is synchronous with the operation of the thyristors in power source 56, its effect is innocuous.

However, the ripple voltage caused by inverter operation are not synchronous with the operation of firing circuit 70. While, as noted supra, inductor 80 absorbs transient voltages in current source power supply 20, its inductance is not large enough to prevent the application of ripple voltages produced by operation of the thyristors of inverter 82 from being sensed by current feedback resistor 74 and applied to power source 56.

At low motor speeds, the inverter ripple voltages of the type described above are small enough to cause no noticeable disturbance. However, as motor 22 is speeded up, the frequency of the inverter ripple component increases. The voltage peaks are also higher in magnitude. At some point, as the speed of motor 22 increases, the ripple frequency produced by the operation of inverter 82 reaches a point at which the current regulating circuitry of power source 56 tends to respond significantly to the aforesaid ripple and current 21 takes on undesired values. Accentuated ripple begins to appear in current 21 circulating in the current source power supply 20. The frequency of this current ripple is the frequency difference, or beat frequency, between the ripple produced by the operation of the thyristors in inverter 82 and the ripple produced by the operation of the thyristors in power source 56.

To avoid the appearance of the above described ripple, the speed of response of the regulating circuitry in power source 56 may be reduced. This effects a filtering action of the inverter ripple. However, this is at the expense of reducing the response speed of the current regulator.

A superior approach is utilized by the power supply shown in FIG. 2. In the power source 56 shown therein, a feedback signal proportional to the rate of change of voltage produced by rectifiers 156, 158, 160, 162, 164 and 166 of power source 56 is provided to firing circuit 70 to accentuate the component of the ripple produced by the operation of the thyristors in power source 56 with respect to the ripple produced by the operation of the thyristors in inverter 82. As the ripple produced by the operation of the aforesaid thyristors is synchronous with, and under the control of, firing circuit 70 of power source 56, emphasizing the component produced by this ripple over that produced by inverter 82, which is uncontrolled by firing circuit 70, lessens the effects of the inverter ripple and reduces the beat frequency ripple in the output current of source 56, while at the same time retaining stable, high response operation of the current regulating circuitry.

To accomplish the aforesaid accentuation of power source ripple, a rate transformer 116 is connected across conductors 64 and 168. As generally defined and known in the art, a rate transformer is one which respons to a changing value of voltage but does not provide a DC component. Such transformers are described in *Electrical Control Systems in Industry* by C. S. Siskind, published by McGraw-Hill, Inc., 1963, at p. 297 et seq. and in *Control of Electric Motors* by P.B. Harwood, published by John Wiley & Sons, Inc., 1952, at p. 221 et seq. Thus, the direct current component of the voltage output of power source 56 is eliminated and only the ripple component is provided by transformer 116. Rate transformer 116 includes primary winding 118 connected in series with resistor 120. Secondary winding 122 is connected to conductor 124 which is connected to current feedback signal conductor 76 at summing junction 126.

The operation of the current regulating circuitry of power supply 52 may be further improved by the addition of compensating winding 132 to rate transformer 116. Compensating winding 132 is connected through resistor 134 to a terminal of inverter 82. Compensating winding 132 provides a signal proportional to the voltage at the inverter terminals, and more specifically, to the ripple voltage existing at the terminal of inverter 82. The compensation provided by the compensating winding 132 is a subtractive one in relationship to the current feedback signal from resistor 74. Its magnitude is selected in relationship to the current feedback signal so that the portion of the current feedback signal (i.e. the very high frequency component produced by the inverter ripple) which is undesirable and unusable by the current regulator is effectively cancelled. The effect of the voltage generated by the inverter on the provision of the output current of power source 56 is thus reduced or eliminated. The above described compensation may be obtained by the winding direction of winding 132 with respect to secondary winding 122.

While FIG. 2 shows the signal from compensating winding 132 as introduced for convenience through the same path as the voltage rate feedback signal, it will be appreciated that a separate connection to the current feedback signal in conductor 76 may be used. Further, inverter voltage compensation may be used in the proper supply of the present invention without voltage rate feedback, if desired.

While power supply 20 has been shown as having a power source 56 suitable for energization by single phase alternating current power mains 50, it will be appreciated that numerous other types of AC to DC conversion apparatus may be employed in power source 56. For example, a single phase rectifier bridge may be employed in the power source. As shown in FIG. 2, where power mains 50 provide polyphase alternating current, the power sources may incorporate polyphase conversion apparatus, such as a polyphase rectifier bridge. In application in which regenerative operation of the power supply load is not desired or required, so that a negative voltage need not be developed in the power supply, such polyphase rectifier bridge may consist of complementary rectifier and diode banks.

While power supply 20 has heretofore been shown as energized by alternating current power mains 50, the motor control may be also operated from direct current mains. This embodiment of the present invention is shown in FIGS. 3 through 8 in which the direct current power mains are diagrammatically shown as the positive and negative terminals of battery 250. The full wave rectifier 56A shown in FIG. 2 may be replaced by the chopper circuitry shown in FIGS. 3 et seq.

To convert the constant output voltage of battery 250 into the adjustable magnitude voltage necessary to maintain the current of the power supply at the desired level, chopper 252 is employed. As its name implies, chopper 252 provides the adjustable magnitude direct current voltage by repetitiously applying the constant voltage of battery 250 for adjustable time intervals so that over a long period the average value of the direct current is at the desired level.

Figure 3:
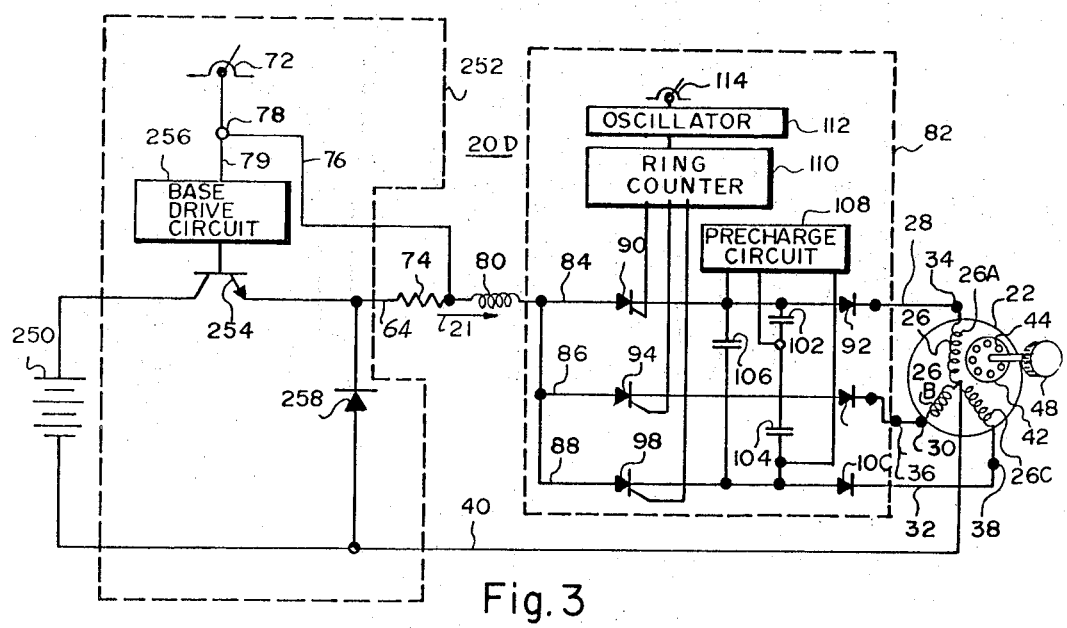
FIG. 3 is a schematic diagram of an adjustable frequency current source power supply suitable for use with a direct current voltage source.

A simple chopper 252 is shown in FIG. 3 to include an on-off switching element shown typically as transistor 254 having the emitter-collector circuit thereof interposed in conductor 64. The on and off states of transistor 254, and particularly the time ratio of the two states, is controlled by the current drive placed on the base terminal of the transistor by base drive circuit 256. The application of base drive signals to the base of transistor 254 is controlled by current regulating circuitry connected to base drive 256 including the current reference signal from potentiometer 72 and the current feedback signal in conductor 76. A diode 258 is connected across conductors 64 and 40 to provide a path for the current when transistor 254 is in the off state. A simple chopper such as chopper 252 is further described in the *RCA Transistor, Thyristor and Diode Manual* published in 1969 at page 146.

Figure 4:
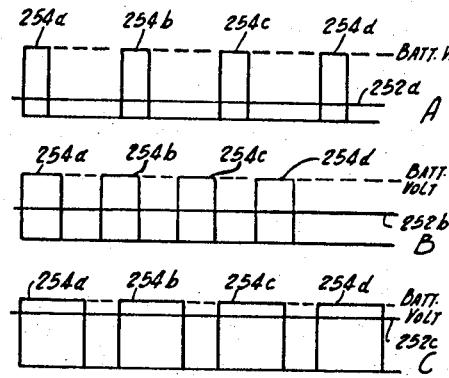
FIGS. 4, 6, 7 and 8 are graphs illustrating the operation of the embodiments of the invention shown in FIGS. 3 and 5.

In operation, transistor 254 is periodically turned on by base drive circuit 256 to provide the voltage from battery 250 for a time interval determined by the current regulating circuitry and depending on the output voltage level from chopper 252 needed to maintain the current of power supply 20D. FIG. 4 shows in graphic form the operation of chopper in providing the current maintaining adjustable voltage level. In FIG. 4A, the on time of transistor 254, indicated by the numerals 254a, 254b, 254c, etc., and during which battery 250 voltage is supplied, is short compared to the off time and the average direct current voltage level 252a produced by chopper 252 is low.

In FIG. 4B, the on periods 254a, 254b, 254c, etc., of transistor 254 are equal to the off periods and the direct current output voltage level 252b of chopper 252 is 50 percent of the voltage of battery 250. In FIG. 4C, the on periods 254a, 254b, 254c, etc. of transistor 254 are three times the length of the off periods and the output voltage level 252c of chopper 252 is 75 percent of the voltage of battery 250.

It will be appreciated that chopper 252 can be operated at any desirable, yet functional, frequency and by increasing the frequency operation of chopper 252, the size of inductor 80 may be reduced over that required for the circuitry shown in FIGS. 1 and 2, in which circuitry the size of the inductor is determined by the 60 cycle frequency of alternating current mains 50.

Where regenerative operation is required, and the electrical energy source for the power supply of the present invention is a fixed voltage direct current source, conventional DC to DC conversion circuitry will not suffice.

FIGS. 5 through 8 show a chopper 260 capable of regenerative operation as an element of power supply 20E.

Chopper 260 includes two series connected transistor and diode pairs connected between conductors 64 and 40. Specifically, the anode of diode 262 is connected to conductor 40. The cathode of diode 262 is connected to the emitter-collector circuit of transistor 264 which, in turn, is connected to conductor 64. The emitter-collector circuit of transistor 266 is connected to conductor 40 and to the anode of diode 268, the cathode of which is connected to conductor 64. The base terminals of transistors 264 and 266 are connected to base drive circuit 256 which control the turn on and turn off of transistors 264 and 266.

Base drive circuit 256 may turn on both transistors 264 and 266 simultaneously for predetermined time intervals in the manner shown in FIG. 4. A direct current path is provided from battery 250 as an electrical source, through transistor 264 to conductor 64 and the remaining portions of power supply 20E and from conductor 40 through transistor 266 back to battery 250.

During the off time of transistors 264 and 266, a current path exists from conductor 40 through diode 262, battery 250 as an electrical load, diode 268, to conductor 64 and the remaining portions of power supply 20E.

Figure 6:
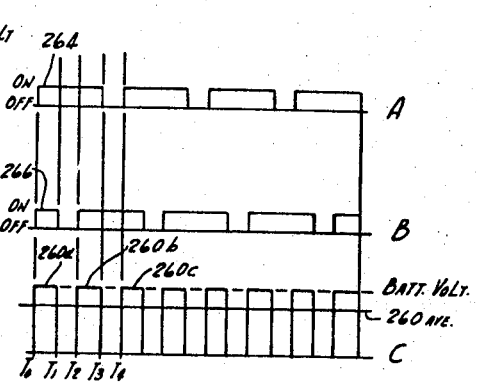
Figure 7:
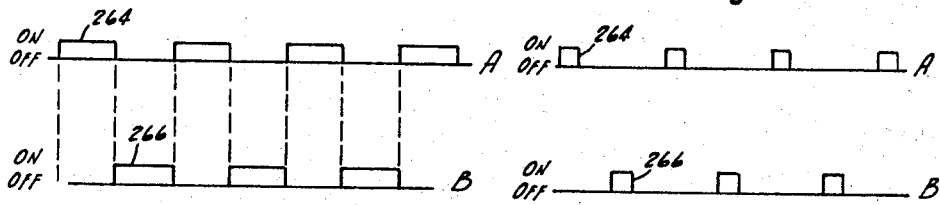
Figure 8:
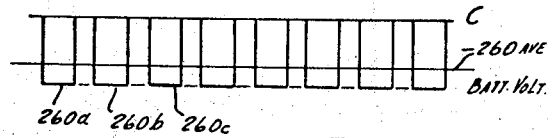

In another mode of operation, the on-off control of transistors 264 and 266 may be provided such that both transistors are not always simultaneously on and simultaneously off during normal power supply operation. This mode of operation is shown in FIGS. 6, 7, and 8. The graphs of FIGS. 6A, B and C show the on-off states of transistors 264 and 266 and the output voltage of chopper 260, including the average output voltage level produced by the operation of chopper 260, respectively. In FIGS. 6A and B, it may be initially assumed that transistors 264 and 266 are both on, providing chopper output voltage 260a. The current path through chopper 260 is as described above from battery 250 through transistor 264 to conductor 64 and from conductor 40 through transistor 266 to battery 250. These conditions exist at time $T_0$. At time $T_1$, transistor 266 is turned off. This removes battery 250 from the circuit and terminates voltage supply 260a. The current 21 of power supply 20E flows from conductor 40 through diode 262, transistor 264, directly to conductor 64, bypassing battery 250 and preventing undue electrical strain thereon.

At time $T_2$, transistor 266 is turned back on and the supply of voltage is resumed as by output voltage 260b. Current flows in the path described above. At time $T_3$, transistor 264 is turned off, switching battery 250 out of the circuit and terminating output voltage 260b. The current 21 of power supply 20 then flows from conductor 40 through transistor 266 and diode 268 directly to conductor 64. At time $T_4$, transistor 264 is turned back on and voltage 260c appears at the output of chopper 260. The above operation is continued to supply average output voltage level $260_{ave}$ to the remaining portions of power supply 20E.

The magnitude of the average output voltage level of chopper 260 is determined by the conductive intervals of transistors 264 and 266, and more specifically by the time intervals during which transistors 264 and 266 are simultaneously on. The shorter the period of simultaneous conduction the lower the average output voltage level. The graphs of FIG. 7 show the operation of chopper 260 for zero output voltage conditions.

During regenerative operation, both transistors 264 and 266 are simultaneously off for all or a portion of the time. The current 21 in conductor 40 flows through diode 262, battery 250 as an electrical load, diode 268 to conductor 64, providing the desired regenerative action. This regenerative action may be relieved to any desired extent commensurate with proper regulation of the power supply current by alternately turning on transistors 264 and 266 to remove battery 250 from the path of current flow, as shown in FIG. 8 in which the graphs of FIGS. 8A, B, C and D correspond in general to FIGS. 6A, B and C.

While the power supply of the present invention has been exemplarily shown and described in connection with an alternating current device in the form of an induction motor, it must be noted that the power supply is also suitable for use with other types of motors, such as synchronous motors, and is suitable for use with other types of alternating current loads, such as induction heating apparatus and high frequency lighting equipment.

Further, the benefits of phase multiplication illustrated by the full wave configuration shown in FIG. 2 may be extended further by techniques commonly used in polyphase rectifier circuitry. For this purpose, and in the case of an alternating current motor, the stator winding 26 may be arranged in two or more isolated groups wherein each grip is made up of stator coils such as 26A, 26B, and 26C in a symmetrical arrangement. Each group may then be connected to its own inverter with the operation of the individual inverters being coordinated to apply current to each coil at the desired time.

Where two or more inverters are employed in the power supply, the connection to the power source may be either serial or parallel. In the series connection, current 21 is identically the same in all inverters. In the parallel connection, an individual inductor 74 may be provided with each inverter to maintain the desired smoothness of direct current in the individual inverters. Alternately, a separate power source may be provided with each inverter, in which case all power sources are made responsive to the same current reference signal.

Phase shifting transformers may be interposed between the inverter of the power supply and the alternating current load to achieve the benefits of multiphase operation without requiring a special grouping of coils in the alternating current load.

Various modes of carrying out the invention are contemplated as being within the scope of the following claims particularly pointing out and distinctly claiming the subject matter which is regarded as the invention.

I claim:

1. A power supply interposible between a source of electrical energy and the terminals of an alternating current device for effecting variable frequency current energization in the device to control the operative condition thereof, said power supply comprising:

a power source having an input connectable to said electrical energy source and including a controllable means for providing a unipolarity output voltage having a predetermined ripple component established by the operation of said controllable means and a unidirectional current at the output of said power source;

current regulating circuitry coupled to said power source for regulating the unidirectional output current to substantially a desired magnitude;

an inductor connected to the output of said power source, said inductor having inductive characteristics sufficient to stabilize the current regulation of the power source and forming, with said power source, a unidirectional current source;

an inverter of the current transfer type having an input connected to said unidirectional current source and an output connectable to the terminals of said alternating current device, said inverter having at least a pair of parallel current paths between the input and output of the inverter each of which includes current transfer control means for providing variable frequency current energization in the alternating current device, said energization generating a voltage including a variable frequency ripple component which is applied to said unidirectional current source; and sensing means coupled in the output of said power source and to said current regulating circuitry for detecting the ripple component of the unipolarity output voltage of the power source and for applying same to said current regulating circuitry for accentuating the ripple component of the unipolarity output voltage in the current regulation of the power source thereby to minimize the effect of the variable frequency ripple component of the inverter generated voltage on the current regulation of the power source.

2. The power supply according to claim 1 wherein said ripple component sensing means provides a feedback signal corresponding to the ripple component of the unipolarity output voltage of the power source to said current regulating circuitry and wherein said current regulating circuitry is responsive to said feedback signal and controls said controllable means.

3. The power supply according to claim 2 wherein said current regulating circuitry includes a current reference signal means, a current feedback signal means providing a current feedback signal and a comparison means coupled to said reference signal means and current feedback signal means and to said power source for regulating the unidirectional output current to substantially a desired magnitude and wherein said ripple component sensing means is further defined as coupled to said current feedback signal means.

4. The power supply according to claim 1 wherein said ripple component sensing means is further defined as a means for detecting the rate of change of the output voltage of the power source.

5. The power supply according to claim 4 wherein said ripple component sensing means includes a voltage rate transformer having a primary winding coupled in the output of the power source and a secondary winding coupled to said current regulating circuitry.

6. The power supply according to claim 1 further including inverter voltage sensing means coupled to the input of the inverter and to said current regulating circuitry for sensing the inverter generated voltage impressed on said current source and for providing compensation to the current regulation of the power source for reducing the effect of the generated voltage on the provision of said unidirectional output current by said power source.

7. The power source according to claim 5 further including inverter voltage sensing means coupled to the input of the inverter and to said current regulating circuitry for sensing the inverter generated voltage impressed on said current source and for providing compensation to the current regulation of the power source for reducing the effect of the generated voltage on the provision of said unidirectional output current by said power source, said voltage sensing means comprising a winding in said rate transformer coupled to the input of said inverter.

8. The power supply according to claim 1 wherein the electrical energy source is an A.C. voltage source having a frequency characteristic and wherein said power source includes a controllable rectifying means for providing a unipolarity output voltage having a ripple component determined by the A.C. voltage frequency characteristic and a unidirectional current at the output of said power source.

9. The power supply according to claim 1 wherein the electric energy source is a direct current source and wherein said power source includes controllable direct current voltage means connectable to the direct current source.

10. The power supply according to claim 9 wherein said controllable direct current voltage means comprises chopper circuitry and wherein the output current maintaining characteristics of said inductor are frequency responsive and wherein said chopper is constructed to provide a pulsating output having a frequency selected to retain the current maintaining characteristics of said inductor.

11. The power supply according to claim 1 for effecting variable frequency current energization in a device capable of operating as an electrical load and as an electrical source, the change from operation of the device as a load to operation as a source being accompanied by a reversal of the voltage polarity in the power supply and wherein said unidirectional current source is so constructed as to provide said unidirectional current of substantially a desired magnitude regardless of the polarity of the voltage impressed on the output of said power source, whereby said power supply may supply current energization of a periodic type from the electrical energy source to the alternating current device as a load and supply energization from the alternating current device as a source to the electrical energy source as a load.

12. The power supply according to claim 1 wherein said inverter is further defined as a diode isolated, capacitor commutated inverter.

13. The power supply according to claim 1 having a plurality of inverters of the current transfer type connectable to said unidirectional current source for providing variable frequency current energization in the alternating current device.

* * * * *